Figure 1:
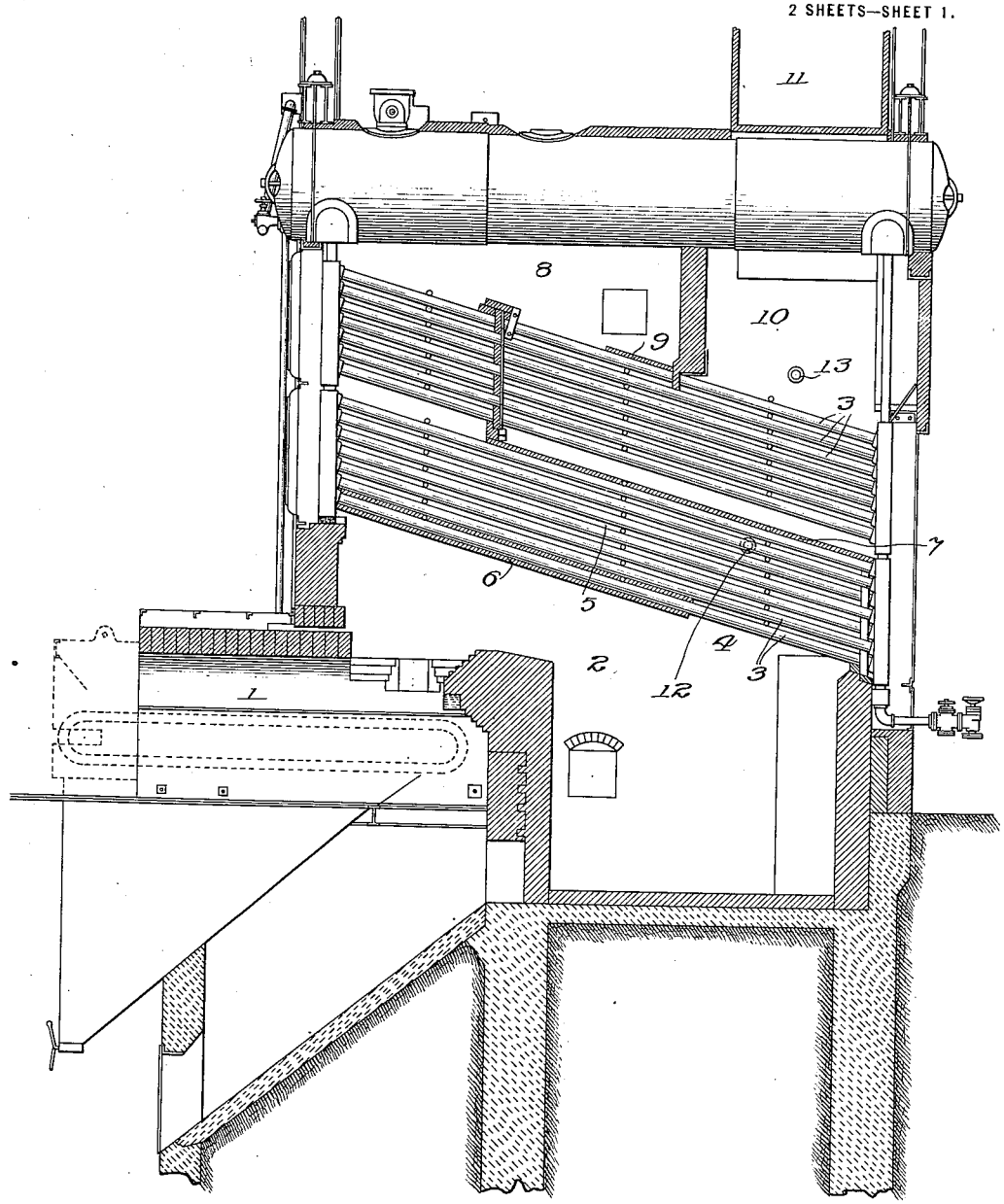

I. H. WILSEY.
METHOD FOR DETERMINING HEAT RATIOS.
APPLICATION FILED DEC. 11, 1912.

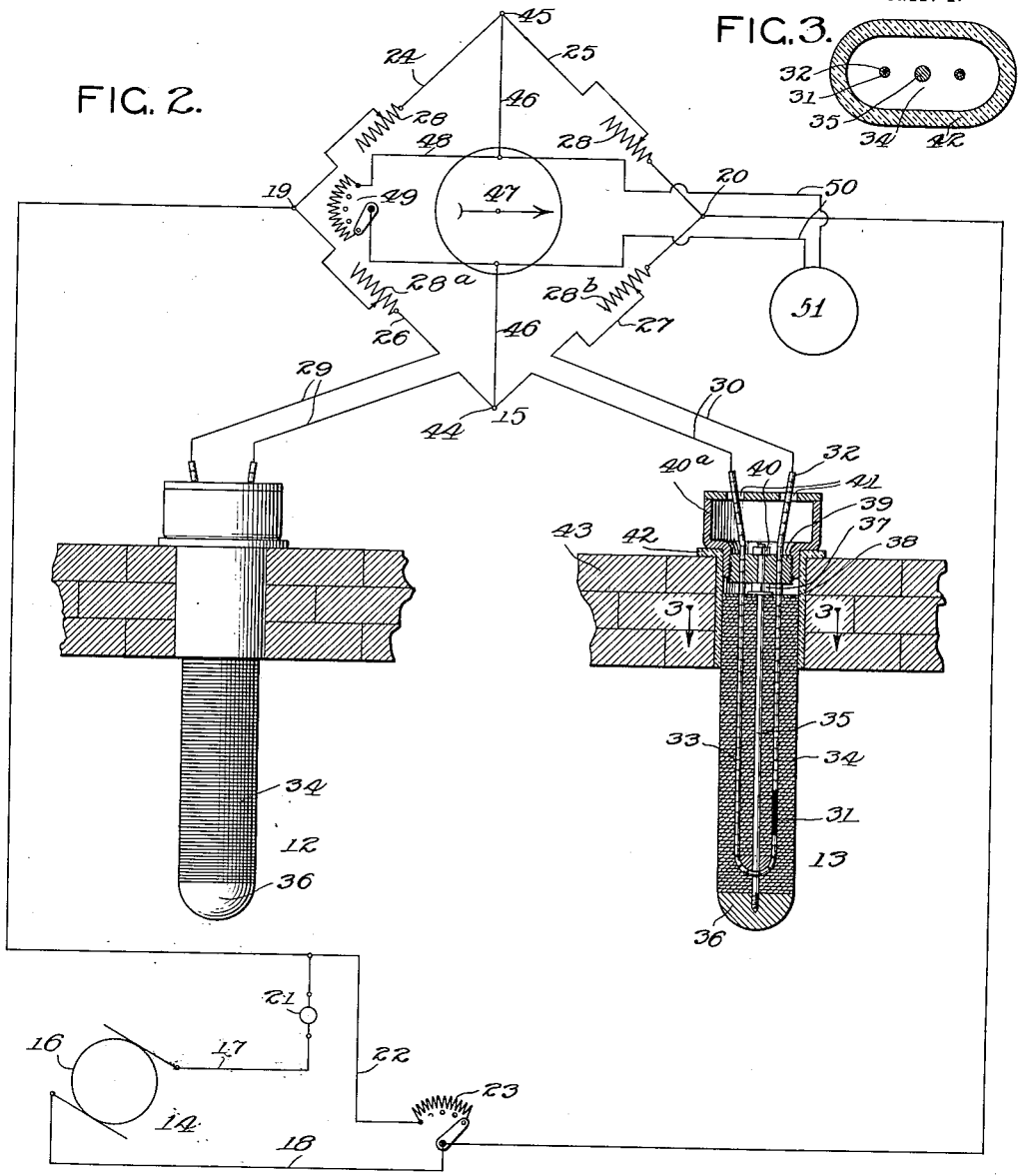

UNITED STATES PATENT OFFICE.

IRVEN HUGH WILSEY, OF CHICAGO, ILLINOIS, ASSIGNOR OF ONE-HALF TO FRANK A. ADKINS, OF CHICAGO, ILLINOIS, AND ONE-HALF TO WALTER H. GREEN, OF CHICAGO, ILLINOIS.

METHOD FOR DETERMINING HEAT RATIOS.

1,238,468.     Specification of Letters Patent.     Patented Aug. 28, 1917.

Application filed December 11, 1912. Serial No. 736,073.

*To all whom it may concern:*

Be it known that I, IRVEN HUGH WILSEY, a citizen of the United States, residing at Chicago, in the county of Cook and State of Illinois, have invented certain new and useful Improvements in Methods for Determining Heat Ratios, of which the following is a specification.

This invention relates to methods for determining or comparing the ratio of the amount of heat contained in one substance to the amount of heat contained in some other substance or in the same substance at some other time or place.

It has for its object providing a method which is applicable in a simple manner to all cases where it is desired to determine or compare relative amounts of heat. And it has particular reference to the determination of heat ratios, or the comparison of heat ratios, in heat-utilizing, or other, apparatus where it is desired to have indicated from time to time, or continuously, the working conditions of the apparatus, particularly with reference to its efficiency. While it is to be understood that the application of the method is not necessarily confined to such apparatus for such purpose, yet, for the purpose of illustrating the method, such application will be considered.

The principles upon which the invention is based will be understood by a consideration of the following: By heat-utilizing apparatus, I refer to any apparatus which utilizes heat energy for the purpose of transforming the energy into other forms of energy or for the purpose of performing work in any way. Whenever any such apparatus is in operation, heat energy is conveyed to the apparatus by means of some substance in the state of a gas, a liquid, or a solid; and the energy is received by the apparatus and transformed into some other form of energy, or is used in performing work, by means of the apparatus, the substance passing on from the apparatus with a diminished amount of energy.

In all such cases, when the substance is received by the apparatus with a certain amount of energy and leaves the apparatus with a less amount of energy, the energy lost is due directly or indirectly to the action of the apparatus upon the substance; and it is in general a measure of the amount of energy received by the apparatus from the substance. By measuring the amount of work performed by the apparatus when the amount of energy received is known, to a certain extent the efficiency of the apparatus may be determined. And in case of a boiler, the efficiency may be determined by taking the ratio of the heat-energy used by the boiler to the heat energy delivered to the boiler by the gases.

Hence, in the application of these principles, the following formula may be used: $(h-h')/h$, (where $h$ is the initial amount of heat and $h'$ is the final amount of heat). This gives the ratio between the heat consumed by the apparatus and the total amount of heat received by the apparatus; and, for the purpose of illustration, this formula will be used; but it will be necessary first to be explicit in reference to the meaning of the various expressions used. Herein, by the expression "the amount of the heat" is meant the relative amount or the amount in excess of what the substance contains when at the room temperature.

It is immaterial whether the ratio of these relative amounts, or the ratio of the absolute amounts, is considered. If the ratio increases or decreases in the one case it will also increase or decrease in the other case. It is true that the magnitude of the increase or decrease will depend materially upon whether the relative amounts or the absolute amounts are considered; but the magnitude of the increase or decrease is immaterial, as the apparatus employed in carrying out the invention may be made as sensitive as is necessary, and a slight increase or decrease in the ratio may be indicated as plainly as may be desired.

If then, we take as $h$ and $h'$ the respective amounts of heat which the substance contains in excess of the amount contained when at, say, the room temperature, then the formula $(h-h')/h$ gives the amount of heat absorbed by the apparatus, divided by the excess amount which the substance conveyed to the apparatus; and this, in general, gives the efficiency of the apparatus.

It is to be understood, however, that this formula necessarily refers to the excess amount of heat and not to the excess temperature. As is well known, the temperature of a substance is not proportional alone to the heat which a substance contains, because the amount of heat depends not only upon the temperature but also upon the mass and the specific heats. The method which I have invented, however, takes into consideration this difference, and is such that the result arrived at is the ratio between certain amounts of heat rather than the ratio between certain temperatures. In order to make this clear a further discussion is necessary.

Considering the passage of hot gases through the boiler flues, the specific heat of the entering gas, because of its higher temperature is different from the specific heat of the gas as it passes away from the apparatus. Under ordinary conditions, the initial temperature of the gas will be in the neighborhood of twenty-five hundred degrees Fahrenheit, while the final temperature will be in the neighborhood of five hundred degrees Fahrenheit, and the specific heat of the gas under the former condition will be much different from that under the latter condition. But the excess amount of heat contained by the gas in each case will be proportional to the product of the temperatures and the specific heat. So that the respective products of the temperatures and the specific heats will give a proper basis for the ratio between the excess heat of the entering gas and the excess heat of the escaping gas, providing the masses are equal.

In an ordinary boiler substantially all of the gas which enters the flues passes away from the flues, so that the masses passing any two points may be considered equal.

We may now consider the type of apparatus which I prefer in carrying out my method.

For the purposes of simplicity it will be well to confine for the moment the description of this apparatus to the determination of temperature ratios only, and then to apply it to the determination of heat ratios.

It is well known that high temperatures, such as exist in furnaces and the hot gas passageways of boilers, may be indicated by various means. Many heat susceptible devices may be used, for example, any suitable form of high temperature measuring instrument, such as an electric pyrometer. Two pyrometers may be inserted in or adjacent to the hot gas passageways of a boiler, one where the gas enters the boiler and the other where it passes away from the boiler. The reading of the pyrometers may be taken at any time or under any such conditions as may be desired, and the ratio between the two temperatures determined. From this ratio, by means hereinafter explained, the ratio between the amounts of energy per unit mass entering and passing away from the boiler flues may be determined.

The accompanying drawings illustrate the preferred form of apparatus which may be used in carrying out my method when applied to a boiler. Figure 1 shows a common form of boiler with certain heat susceptible devices applied thereto. Fig. 2 shows diagrammatically a complete apparatus for determining heat ratios with reference to the boiler. Fig. 3 shows a section along the line 3 3 of Fig. 2.

As it is frequently desirable to indicate merely the ratio of the temperatures at two points, rather than the actual temperature at either of the points, I have selected in this particular instance for a more complete form of apparatus a pyrometer that indicates variations in the temperature by means of a flow of electricity through certain electric conductors in the instrument. As the resistance of a conductor depends upon its temperature, and as the amount of current flowing depends upon the resistance, the amount of current flowing will indicate, when the measuring instrument is properly calibrated, variations in the temperature of the conductor, and hence variations in the temperature of the hot gases surrounding the conductor, and such variations may be indicated by various current-measuring devices. It is to be understood, however, that although I use, in this particular instance, this form of pyrometer, yet any suitable form of pyrometer may be employed; and in the application of the method to various other apparatus it is evident that various other forms of heat or temperature-measuring devices will be preferable.

As above mentioned, it is frequently desirable to know the ratio of the temperatures at two points rather than the actual temperature at either of the points; and hence, in the application of my invention, I use apparatus which indicates such a ratio and does not necessarily determine the actual temperature at either of the points. As ratios between resistances may be indicated by various resistance-measuring devices, it is evident that ratios between temperatures, by the use of said pyrometers, may also be indicated by such devices.

Although various other forms of relative-temperature-indicating devices or relative-resistance-indicating devices may be used in the application of my invention, yet in this particular instance I have preferred for the purpose what is known as the ordinary Wheatstone bridge. As is well known, with a pyrometer, such as above described, connected properly in each of two adjacent arms of such a bridge, variations in the ratio of the resistances of the electric conductors of the pyrometers, and hence variations in the ratio of the temperatures of the conductors and the adjacent gases, will be indicated by a galvanometer properly connected to the bridge.

In the drawings, 1 indicates the firebox of the boiler. The hot gases generated in the firebox by the combustion of the fuel pass into the chamber 2 beneath the boiler tubes 3. The gases then pass through the opening 4 into the tube passageway 5 between the baffle plates 6 and 7, and upward into the chamber 8 beneath the drum of the boiler, thence downward through the upper sets of tubes beneath the baffle plate 9 and into the chamber 10, and finally out of the chimney 11. The pyrometer 12 is, in this instance, located in such a position as to be affected by the heat of the gases as they pass into the tube passageway; and the pyrometer 13 is so located as to be affected by the gases as they finally pass away from the tubes, so that the respective pyrometers will be affected by the initial and final temperatures of the gases, so far as the effect of the gases on the water tubes is concerned. Slight variations in the positions of the pyrometers, however are immaterial, and it is not even necessary that they should be in the passageway itself. They may be protected by any suitable covering in the passageway, or they may be located entirely outside of the passageway, but adjacent thereto so that they may be sufficiently affected by variations in the temperature of the gases.

Referring to Fig. 2, it will be seen that the system, in this instance, in addition to the pyrometers 12 and 13, comprises a current-producing apparatus 14 and a Wheatstone bridge 15.

The current-producing apparatus may be of any suitable form. In this instance, however, I have shown a generator 16 with leads 17 and 18 running to the corners 19 and 20 of the bridge. In the line may be placed, if desired, a lamp 21, or any other suitable resistance, in order to decrease the amount of current flowing. The line wire 18 may be connected to the line 17 by means of the conductor 22 in series with the rheostat 23. As this line is in parallel with the bridge, it is adapted, by means of the rheostat, to reduce still more, or to vary, the flow of current through the bridge. The bridge 15 comprises the arms 24, 25, 26 and 27. In each of the arms a variable resistance 28, 28ᵃ or 28ᵇ may be placed, if desired, in order to suitably adjust the relative resistances of the various arms and for the reason hereinafter specified. The pyrometer 12 is connected in series with the arm 26 by means of the wires 29, and the pyrometer 13 is connected in series with the arm 27 by means of the wires 30.

The pyrometers may be constructed in any suitable manner. In this instance I have chosen as the heat susceptible electric conductors the wires 31 which may be made of any metal which is not injuriously affected by the action of high temperatures, for example, platinum. In order that changes in temperature of these wires shall affect the system as much as possible, the wire should be of comparatively small cross-section and as long as is practicable; while the connecting wires 29 and 30 should be comparatively large in cross-section so as to offer but little resistance to the flow of electricity, so that changes of temperatures of these wires will not materially affect the system.

In order to suitably protect the platinum wires, I pass them through beads 32 of some suitable insulating material, for example, magnesia. I then pass the wires inclosed by these beads through openings 33 in oblong sheets of suitable material, such as mica. These sheets are held in place by means of a rod 35 threaded into a button 36. At the other end of the rod is a nut 37, into which the rod is threaded. This nut presses on a plate 38 and forces the mica sheets close together. The metal cylinder 39 is then passed over the wires and the rod 35 and is fixed to the rod by means of the nut 40. This cylinder forms a head for the pyrometer by means of which it may be screwed into an ordinary conduit-outlet 40ᵃ with the two terminal openings 41. The pyrometer may be placed in a porcelain tube 42 which is fixed in the wall 43 of the boiler.

As the resistance of metals, such as platinum, varies slightly with the temperature and as the variation is not exactly in proportion to the relative temperatures, material variations in temperature of the hot gases affecting the pyrometers will cause slight errors in the indications of the galvanometer. In practice these errors are of little consequence, and by proper adjustment of the variable resistances 28 in the arms of the bridge, the errors may be reduced to a negligible quantity.

The corners 44 and 45 of the bridge may be connected, by means of wires 46, to the galvanometer 47. A line 48 may be placed in parallel with the galvanometer so that, by means of the rheostat 49, the current flowing through the galvanometer may be varied. Also, if desired, a recording apparatus 51 may be placed in parallel or in series with the galvanometer by suitably connecting the same with the wires 50.

The operation of the apparatus is as follows: As is well known, with a Wheatstone bridge arranged as indicated in Fig. 2, so long as the ratio of the resistances of two adjacent arms is equal to the corresponding ratio of the resistances of the other two arms, there will be no current flowing through the galvanometer. But, if for any reason the resistance of any of the arms changes so that this proportion no longer holds true, current will flow through the galvanometer. Hence, if the ratio of the resistances of the arm 26 to that of the arm 27 is equal to the ratio of the resistances of the arm 24 to the arm 25 there will be no current through the galvanometer. If, however, the ratio of the resistances in either pair of arms is varied, current will flow. If now, with the pyrometers in the tube passageways as indicated, they are heated normally by the hot gases and the variable resistances in some of the arms are adjusted so that no current flows through the galvanometer, any variation in the ratio of the temperatures at the points where the pyrometers are located will vary correspondingly the ratio of the resistances of the arms 26 and 27 and this will be indicated by the galvanometer, and will indicate a variation in the ratio of the temperatures of the hot gases flowing through the passageways.

Hence, in carrying out my invention with this apparatus, it is necessary only to adjust the resistances so that a certain galvanometer current will flow when the boiler is operating under any desired conditions; and then any variations from such conditions will cause variations in the ratio between the resistances, and this will be indicated by the galvanometer.

The apparatus as above described gives necessarily results relating only to temperatures. In order to give results relating to amounts of heat any suitable means may be employed so as to vary the effect upon the indicating apparatus of the temperatures in proportion also to the specific heats and the masses of the gases. If, for instance, the specific heat of one substance were twice that of the other substance, or the substance at some other point of the apparatus and hence at some other temperature, in order to show the effect of the amounts of heat rather than the effects of the temperatures it would be necessary for the heat susceptible device associated with the substance having the higher specific heat to have twice the effect on the indicator of the other heat susceptible device. In other words the effect due to one degree variation with the former device should be double that of the latter device.

In order to bring about this result, the rheostats $28^a$ and $28^b$ are provided in the arms of the Wheatstone bridge. If, for example, the specific heat of the substance in contact with the pyrometer 12 were twice that of the substance in contact with pyrometer 13, it would be necessary in order to indicate relative heat magnitudes to have the pyrometer 12 per degree change twice as effective as the pyrometer 13. To accomplish this the rheostat $28^a$ is short-circuited, or removed, so that it has no effect on the arm 26, while the rheostat $28^b$ is set so that its resistance is equal to the average resistance of the pyrometer 13. Under these conditions a change of temperature of one degree will have twice the effect in varying the ratio between the resistances of the arms 26 and 27 in case of the pyrometer 12 as in case of the pyrometer 13.

Where the masses are equal, in order to indicate relative heat magnitudes rather than relative temperatures it is necessary merely to dispense with the rheostat of the pyrometer which is in contact with the substance having the greater specific heat and adjust the other rheostat so that its resistance plus the adjacent pyrometer resistance is to said pyrometer resistance as the greater specific heat is to the lesser.

If, for any reason, it is desired to determine the ratio of the heat magnitudes of the two gases per unit volume, a similar adjustment is made. The ratio of the densities of the substances is determined in any suitable manner and the resistances are adjusted as before proportional to these densities, omitting, as before, the rheostat of the pyrometer which is in the denser substance and hence is to be made most effective per degree rise of temperature. If both the densities and the specific heats are to be considered it is necessary only to adjust the rheostat so that its resistance plus the resistance of the adjacent pyrometer is to said pyrometer resistance as the respective products of the densities and specific heats of the substances involved, omitting the rheostat of the pyrometer which is to be made most effective, that is, which is in contact with the substance requiring the greater amount of heat to raise its temperature one degree.

Evidently the indicating scale adopted on the galvanometer may be varied to suit any desired conditions. It may be calibrated to read directly the actual efficiencies or the actual heat ratios in any particular instance. In either case it is evident that the relative ratios due to varying conditions would be indicated. Or it may be calibrated so as to indicate relative ratios only.

With reference to these various matters, the following may be of value:

The heat formula $(h-h')/h$ hereinabove referred to, when expressed in terms of temperatures and specific heats, would be $(ts-t's')/ts$, where $s$ and $s'$ are the respective specific heats. Or, if the actual heat magnitudes in any particular instance, for any reason, are desired, the formula would become $(tsm-t's'm')/tsm$, where $m$ and $m'$ are the respective masses. Now for simplicity, using the former formula we have $(h-h')/h$ equals $1-h'/h$. Evidently therefore the simple ratio $h'/h$ answers every purpose of the differential ratio, because, as the simple ratio decreases the differential ratio will increase, and as the pointer of the galvanometer passes in one direction to indicate a decrease in the simple ratio, which is the actual ratio that affects the apparatus, it would at the same time indicate an increase in the differential ratio, and hence an increase in efficiency.

By this apparatus therefore it is evident that efficiency or other heat ratios may be actually determined or they may be compared; and that such ratios may be either simple temperature ratios or heat magnitude ratios, and this is true whether or not the masses or the specific heats of the substances are equal.

It is to be understood, however, that the method is not limited in its application to any particular apparatus or substances or art, but that it may be applied wherever it is desired to determine or compare temperatures or heat magnitudes with reference to any substances or objects located or used in the same or in different devices or apparatuses, and whether the substances or objects are adjacent to or remote from each other.

I claim as my invention:

1. A method for determining the relative efficiency of a heat utilizing apparatus, which consists in determining at some particular time the ratio of the relative amount of heat-energy conveyed to the apparatus by some substance, per unit mass, to the relative amount of heat-energy conveyed away from the apparatus by the substance, per unit mass, and in comparing this ratio with a ratio similarly obtained at some other time.

2. A method for determining the efficiency of a heat-utilizing apparatus consisting in determining the relative effect upon a device of the heat per unit mass of a substance conveyed away from the apparatus by said substance and conveyed to the apparatus by said substance.

3. A method for assisting in increasing the efficiency of a heat utilizing apparatus consisting in continuously determining the ratio of the temperatures of heat transmitting substances at two points of the apparatus spaced a material distance apart in the path of flow of the substances.

4. A method for determining the efficiency of a heat utilizing apparatus which consists in continuously determining the ratios of the respective products of the temperatures and specific heats of heat transmitting substances at two points of the apparatus spaced a material distance apart in the path of flow of the substances.

5. A method for determining heat ratios consisting in producing variations in an electric current at each of two points corresponding to variations in the heat-energy intensity at said respective points, in causing the variable currents of electricity thus produced, to produce variations in a third electrical current corresponding to the relative variations in said first two mentioned currents, and in causing said third current to produce corresponding sensible effects.

6. A method for determining temperature ratios between two masses consisting in causing variations in the energy contents of two substances corresponding respectively to temperature variations in the two masses, in causing variations in the energy content of some third substance corresponding to the relative variations in the energy contents of said first two mentioned substances, and in causing the energy variations in said third substance to produce sensible effects.

7. A method for determining heat ratios consisting in producing variations in an electric current at each of two points corresponding to variations in the heat-energy at said respective points, and in causing the variable currents of electricity thus produced to produce variations in a third electrical current corresponding to the relative variations at said points, and in causing said third electrical current to produce corresponding sensible effects.

8. A method for determining heat ratios consisting in producing variations in an electric current at each of two points corresponding to variations of the temperatures at said respective points, in causing the variable currents of electricity thus produced to produce variations in a third electric current corresponding to the relative variations in said first mentioned currents, and in causing said third current to produce corresponding sensible effects.

9. A method for determining the efficiency of an apparatus affected by a heat-energy conveying substance, consisting in transmitting from each of two places of the apparatus, spaced a material distance apart along the path of flow of the substance, variations in energy corresponding to the respective variations in heat-energy at said places, and in causing the energy variations so transmitted to coact at a third place and produce sensible effects corresponding to the relative heat-energy variations at said first mentioned places.

10. A method for determining the efficiency of a heat-energy utilizing apparatus which consists in continuously determining the ratios between the initial and final temperatures of the substance conveying the heat-energy to and away from the apparatus and in continuously and simultaneously with said determinations correcting said ratios to compensate for the relative specific-heats of said substances.

In witness whereof I hereunto affix my signature in the presence of two witnesses.

IRVEN HUGH WILSEY.

Witnesses:
E. J. ANDREWS,
C. PAUL PARKER.